United States Patent [19]

Aoshima et al.

[11] Patent Number: 4,568,775
[45] Date of Patent: Feb. 4, 1986

[54] PROCESS FOR PRODUCING POLYETHERGLYCOL

[75] Inventors: Atsushi Aoshima, Yokohama; Shoichiro Tonomura, Fuji, both of Japan

[73] Assignee: Asahi Kasei Kogyo Kabushiki Kaisha, Osaka, Japan

[21] Appl. No.: 610,741

[22] Filed: May 16, 1984

[30] Foreign Application Priority Data

May 23, 1983 [JP] Japan ................................. 58-89081
May 31, 1983 [JP] Japan ................................. 58-95036

[51] Int. Cl.$^4$ ...................... C07C 41/01; C07C 41/02
[52] U.S. Cl. ................................................. 568/617
[58] Field of Search ......................................... 568/617

[56] References Cited

U.S. PATENT DOCUMENTS 4,120,903 10/1978 Pruckmayr et al.
4,163,115  7/1979 Heinsohn et al.
4,202,964  5/1980 Pruckmayr et al. ................ 568/617
4,371,713  2/1983 Matsumoto et al. ................ 568/617

OTHER PUBLICATIONS

Izumi et al., CA 99, 52883d (1983), J. Mol. Catal 1983, 18 (3) 299–314.
Japanese Patent Publication No. 58('83)–83028 Relating to Japanese Patent Application No. 18073/'81 (Daicel).

Primary Examiner—Howard T. Mars
Attorney, Agent, or Firm—Finnegan, Henderson, Farabow, Garrett & Dunner

[57] ABSTRACT

A process for producing a polyoxytetramethylene glycol or a copolymerized polyetherglycol by polymerizing tetrahydrofuran or a mixture of tetrahydrofuran with other cyclic ethers copolymerizable therewith, which comprises using a heteropoly-acid as a catalyst and permitting 0.1 to 15 mol of water per mol of the heteropolyacid to be present in the catalyst phase.

The above-described polymer and copolymer are industrially useful polymers which can be used as the primary starting materials for polyurethanes to be used for a spandex and a synthetic leather, solvents, pressured fluids, etc.

22 Claims, 1 Drawing Figure

FIGURE
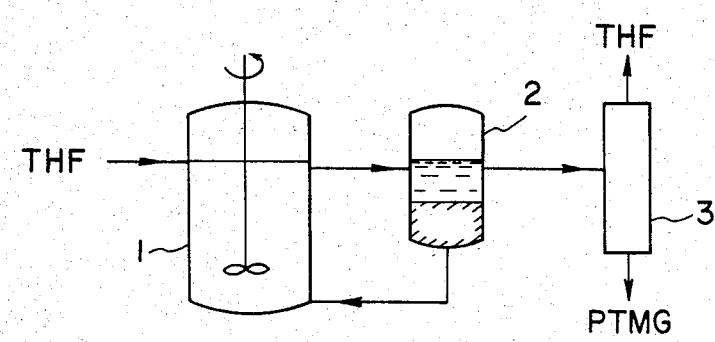

PROCESS FOR PRODUCING POLYETHERGLYCOL

DESCRIPTION

1. Technical Field

The present invention relates to a process for producing a polyoxytetramethylene glycol (hereinafter abbreviated as "PTMG") or a copolymerized polyetherglycol containing oxytetramethylene groups (hereinafter written as "PTMG type polyether glycol") by polymerizing tetrahydrofuran (hereinafter abbreviated as "THF") or copolymerizing a mixture of THF with other cyclic ethers copolymerizable therewith, which comprises using a novel polymerization catalyst.

2. Background Art

PTMG and PTMG type polyetherglycol are industrially useful polymers which can be used as the primary starting materials for polyurethanes to be used for a spandex and a synthetic leather, solvents, pressured fluids, etc. And their uses are increasingly developed in recent years.

PTMG can be produced by polymerization of THF. However, this polymerization reaction is a cationic polymerization and cannot easily proceed, and therefore the catalyst employed has been a proton acid or Lewis acid having great acid strength which is classified as a super acid, frequently together with an activator. Typical examples of the former are fluorosulfonic acid as disclosed in U.S. Pat. No. 3,358,042 and Japanese Pat. Publication After Examination No. 32799/1977 and fuming sulfuric acid as disclosed in U.S. Pat. No. 3,712,930, while those of the latter are perchloric acid-acetic anhydride [see H. Meerwein, D. Delfs, H. Morschel, Angew. Chem., 72, 927 (1960); Japanese Pat. Publication After Examination No. 13940/1960], $BF_3$-HF-acetic anhydride and Nafion ® (fluorinated sulfonic acid resin)-acetic anhydride as disclosed in U.S. Pat. No. 4,163,115, and these are practically utilized in industrial applications.

The vital defect common to the prior art processes is that PTMG cannot be produced from the THF in one step. Specifically, both terminal ends of PTMG must be hydroxyl groups, but a polymer immediately after polymerization according to the prior art processes are terminated with —$SO_3H$ groups or —$OCOCH_3$ groups, which are further required to be hydrolyzed into hydroxyl groups by addition of water or alkaline water. Thus, the two-step process is employed in the prior art, which brings about a number of disadvantages in industrial application. For example, hydrolysis of terminal acetyl groups obtained in the presence of acetic anhydride requires so severe conditions as heating under reflux for 1 to 5 hours for the purpose of avoiding even remaining of a trace of acetyl groups, requiring also an alkali, whereby acetic anhydride is consumed and recycle of the acid catalyst is also rendered difficult.

In the case of using a fluorosulfonic acid catalyst, hydrolysis of the $SO_3H$ groups can proceed readily with only addition of water, but fluorosulfonic acid is decomposed into hydrogen fluoride and sulfuric acid to result in consumption of a large amount of expensive reagents simultaneously with a large amount of cost for installation investment for disposal of HF, etc. generated.

A polymerization process using fuming sulfuric acid as a catalyst is also known and this process can be used for uses in which the molecular weight is limited to around 1000. However, in this case, water must be added in the post-treatment and utilization of the catalyst by recycle is very difficult.

As described above, advent of a catalyst capable of synthesizing in one step from THF together with the presence of water and also affording use by recycle has not yet been realized, while it has been a dream to those skilled in the art.

Under such a situation, the inventors of the present invention have made investigations about a process capable of polymerizing THF without use of an activator, etc. and also converting it in one step into PTMG having terminal OH groups, and consequently found that such a purpose can be accomplished by use of a certain kind of catalyst and completed the present invention.

BRIEF DESCRIPTION OF DRAWING

FIGURE shows a schematic flow chart of the continuous polymerization device used in Example 4, in which 1 is a polymerization tank, 2 is a phase separation tank and 3 is a distillation tower.

DISCLOSURE

The present invention provides a process for producing a polyoxytetramethylene glycol or a copolymerized polyetherglycol by polymerizing tetrahydrofuran or a mixture of tetrahydrofuran with other cyclic ethers copolymerizable therewith, which comprises using a heteropoly-acid as a catalyst and permitting 0.1 to 15 mol of water per mol of the heteropoly-acid to be present in the catalyst phase.

In general, a heteropoly-acid exists with 20 to 40 molecules of water coordinated per one molecule and under this state, no polymerization activity could be recognized at all when using such a heteropoly-acid as a catalyst and contacted with THF or a mixture of THF with other cyclic ethers copolymerizable therewith at substantially the same weight as the catalyst, i.e., at a weight ratio of 1:1 of the monomer(s) to the catalyst.

Whereas, when the above-described heteropolyacid is subjected to drying treatment to change its number of water molecules coordinated in the catalyst, namely the molar ratio of the water coordinated to the heteropoly-acid, for examination of polymerization activity, it has unexpectedly be found that polymerization activity appeared when the molar ratio of water existing in the catalyst phase to the heteropoly-acid is reduced to not higher than 15 and, moreover, that the both of the terminal ends of the polymer obtained has become —OH groups, resulting to provide directly PTMG. In particular, a higher activity can be exhibited in the case of a molar ratio of water existing in the catalyst phase to the heteropoly-acid of 1 to 8, and the resultant polymer synthesized is found to have a number-average molecular weight of about 800 to 3500, with a sharp molecular weight distribution, which is preferable as the starting material for a polyurethane elastomer such as spandex.

According to the knowledge commonly accepted in the art, the catalyst for THF polymerization is required to have a strong acidity such as of a super acid, and presence of water in the reaction system has been considered to deactivate the polymerization catalyst or become an obstacle in obtaining a desired molecular weight. This is the reason why the known catalysts as described above such as fluorosulfonic acid, fuming sulfuric acid, etc. have been practically used.

On the other hand, it has been found by the inventors of the present invention that a heteropolyacid, while it is lower in acidic strength than a super acid, can allow polymerization to proceed at a sufficient rate even in the presence of water which has been believed to interfere with polymerization of THF, and this is surprising enough.

In the present invention, the water permitted to exist in the catalyst phase is estimated to exist in the state coordinated to the catalyst, when the catalyst is a solid phase, while in the state coordinated or hydrated to the catalyst or dispersed in the catalyst phase, when the catalyst is a liquid phase.

Although the detailed mechanism remains to be elucidated, it may be estimated that THF is activated by its coordination with the heteropoly-anion in the copresence of a limited number of water molecules sufficiently to be polymerized.

The water to be permitted to exist in the catalyst phase can be incorporated into the polymerization system in the state coordinated to the heteropolyacid, or alternatively separately from the catalyst.

In order to obtain a heteropoly-acid with a desired number of coordinated water molecules, the heteropoly-acid is heated at a temperature lower than the decomposition temperature of the heteropoly-acid. Since the decomposition temperature of the catalyst differs slightly depending on the type of the catalyst, the heating temperature is determined on the type of the catalyst, but heating is effected generally at a temperature within the range of from 60° C. to 320° C. The heating temperature can be lowered and the heating time also shortened by reducing the pressure in the system to about several Torr.

Analysis of the water in the catalyst phase in the polymerization system can be conducted according to a conventional method. For example, it can be measured by means of a Karl-Fischer water content analyzer. On the other hand, the amount of the heteropoly-acid in the catalyst phase can be analyzed by removing the coexisting water and THF by heating. The molar ratios of both can be calculated as the molar ratio of water to heteropoly-acid in the catalyst phase.

The water existing in the polymerization system will be consumed for hydroxylation at the terminal ends as polymerization proceeds, whereby the water existing in the catalyst phase will be reduced. With the reduction in amount of water existing in the catalyst phase, the molecular weight of the resultant polymer becomes higher. Further, at a level of the molar ratio of water to the heteropoly-acid in the catalyst phase less than 0.1, hydroxylation of the terminal ends will be lowered in efficiency. Accordingly, it is necessary to control the above-described molar ratio in the range of from 0.1 to 15 by addition of water into the system.

If the above-described ratio exceeds 15, the polymerization activity will be lost as referred above. The value of the above-described ratio suitable for polymerization in respect of activity may differ depending upon the types of the heteropoly-acids employed. Also, since the molecular weight of the polymers synthesized will effected by the value, in order to synthesize polymers with substantially uniform molecular weight, it is necessary to carry out the reaction, while controlling the amount of water to a suitable one which is determined by the sort of the heteropoly-acid employed and the desired molecular weight of the polymer to be obtained.

The catalyst to be used in the present invention exists as the lower phase of two liquid phases or as a solid phase. After the polymer has grown to a certain molecular weight and the terminal ends thereof have been hydroxylated, it will be migrated to the THF layer, whereby the polymerization product can easily be separated from the catalyst and the catalyst separated, which exhibits substantially no decrease in activity, can be recycled for reuse.

The heteropoly-acid according to the present invention means comprehensively to the oxy acids formed by condensation of at least one oxide of Mo, W and V with oxy acids of other elements such as P, Si, As, Ge, B, Ti, Ce, Co, etc. the atomic ratio of the former to the latter being 2.5 to 12, preferably 12 or 9. Exemplary heteropoly-acids which can be employed in the present invention include 12-molybdophosphoric acid, 5-molybdo-2-phosphoric acid, 12-tungstophosphoric acid, 12-molybdotungstophosphoric acid, 6-molybdo-6-tungstophosphoric acid, 12-molybdovanadophosphoric acid, 11-molybdo-1-vanadophosphoric acid, 12-molybdotungstovanadophosphoric acid, 12-tungstovanadophosphoric acid, 12-molybdoniobophosphoric acid, 12-tungstosilicic acid, 12-molybdosilicic acid, 12-molybdotungstosilicic acid, 12-molybdotungstovanadosilicic acid, 12-tungstoboric acid, 12-molybdoboric acid, 12-molybdotungstoboric acid, 12-molybdovanadoboric acid, 12-molybdotungstovanadoboric acid, 9-molybdonickelic acid, 6-molybdocobaltic acid, 6-tungstocobaltic acid, 11-molybdoarsenic acid, 12-tungstoarsenic acid, 12-tungstogermanic acid, 18-tungsto-2-arsenic acid, 18-molybdo-2-phosphoric acid, 9-molybdophosphoric acid, 18-tungsto-2-phosphoric acid, 12-titanomolybdic acid, 12-ceriomolybdic acid, 18-molybdo-2-phosphoric acid, etc. Preferred examples of the heteropoly-acid include 12-molybdophosphoric acid, 18-molybdo-2-phosphoric acid, 9-molybdophosphoric acid, 12-tungstophosphoric acid, 18-tungsto-2-phosphoric acid, 11-molybdo-1-vanadophosphoric acid, 12-molybdotungstophosphoric acid, 6-molybdo-6-tungstophosphoric acid, 12-molybdotungstovanadophosphoric acid, 12-tungstovanadophosphoric acid, 12-molybdosilicic acid, 12-tungstosilicic acid, 12-molybdotungstosilicic acid, 12-molybdotungstovanadosilicic acid, 12-tungstoboric acid, 12-molybdoboric acid, 12-molybdotungstoboric acid, 12-molybdovanadoboric acid, 12-molybdotungstovanadovoric acid, 12-tungstogermanic acid and 12-tungstoarsenic acid.

The amount of the heteropoly-acid employed is not particularly limitative, but the polymerization rate is lower, if the amount of the heteropoly-acid in the reactor is too low. Therefore, it is desirable to use the catalyst in an amount of 0.05 to 20-times, preferably 0.3 to 5-times, the amount of THF employed.

THF provided for polymerization should preferably contain no impurity such as peroxides. As for the water content, it is important to control in the reaction system the molar ratio of water in the catalyst phase to the heteropoly-acid.

The cyclic ethers copolymerizable with tetrahydrofuran are not particularly limitative, provided that they are cyclic ethers capable of ring-opening polymerization, and may include, for example, 3-membered cyclic ethers, 4-membered cyclic ethers, cyclic ethers such as tetrahydrofuran derivatives, and cyclic ethers such as 1,3-dioxolan, trioxane, etc. Preferable cyclic ethers are 3-membered cyclic ethers of the formula:

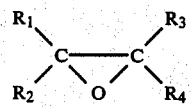

wherein $R_1$–$R_4$, which may be same or different, represent hydrogen atoms, alkyl groups having 1 to 10 carbon atoms, halogen atoms, halo-substituted alkyl groups having 1 to 10 carbon atoms or phenyl groups;

4-membered cyclic ethers of the formula:

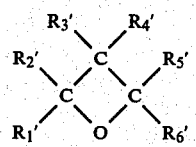

wherein $R_1'$–$R_6'$, which may be same or different, represent hydrogen atoms, alkyl groups having 1 to 10 carbon atoms, halogen atoms or halo-substituted alkyl groups having 1 to 10 carbon atoms; and 5-membered cyclic ethers of the formula:

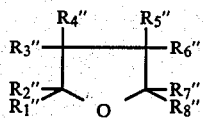

wherein $R_1''$–$R_8''$, which may be same or different, represent hydrogen atoms, alkyl groups having 1 to 10 carbon atoms, halogen atoms or halo-substituted alkyl groups having 1 to 10 carbon atoms, at least one of $R_1''$–$R_8''$ being not hydrogen atom.

Examples of the substituents represented by $R_1$–$R_4$, $R_1'$–$R_6'$ and $R_1''$–$R_8''$ in the above formulae include alkyl groups having 1 to 10 carbon atoms such as methyl, ethyl, propyl, butyl, pentyl, nonyl, etc.; halogen atoms such as chlorine, bromine, iodine, etc.; halo-substituted alkyl groups having 1 to 10 carbon atoms such as chloromethyl, bromomethyl, iodomethyl, fluoromethyl, dichloromethyl, 2-chloroethyl, 3-chloropropyl, 3,3,3-tribromopropyl, etc. Typical examples of the compounds represented by the above formulae may include ethylene oxide, propylene oxide, 1,2-butylene oxide, isobutylene oxide, trimethyleneethylene oxide, tetramethyleneethylene oxide, styrene oxide, 1,1-diphenylethylene oxide, epifluorohydrin, epichlorohydrin, epibromohydrin, epiiodohydrin, 1,1,1-trifluoro-2-propylene oxide, 1,1,1-trifluoro-2-methyl-2-propylene oxide, 1,1,1-trichloro-2-methyl-3-bromo-2-propylene oxide, 1,1,1-tribromo-2-butyleneoxide, 1,1,1-trifluoro-2-butyleneoxide, 1,1,1-trichloro-2-butylene oxide, oxetane, 3-methyloxetane, 3,3-dimethyloxetane, 3,3-diethyloxetane, 3,3-bis(chloromethyl)oxetane, 3,3-bis(bromomethyl)oxetane, 3,3-bis(iodomethyl)oxetane, 3,3-bis(fluoromethyl)oxetane, 2-methyltetrahydrofuran, 3-methyltetrahydrofuran, 2-methyl-3-chloromethyltetrahydrofuran, 3-ethyltetrahydrofuran, 3-isopropyltetrahydrofuran, 2-isobutyltetrahydrofuran, 7-oxabicyclo(2,2,1)heptane, etc. The content of the copolymerized cyclic ether in a copolymer may be within the range of from 0.5 to 99.5% by weight, but when obtaining a copolymerized polyetherglycol containing oxytetramethylene groups as a main component which is effective as the soft segment in a polyurethane elastomer such as spandex, the amount of the cyclic ether copolymerizable with THF may be generally not more than 100 parts by weight, preferably not more than 50 parts by weight based on 100 parts by weight of THF.

Also, in the synthesizing reaction of PTMG, a part of the starting THF may be replaced with an oligomer of PTMG as the starting material. Further, in the synthesizing reaction of a copolymerized polyetherglycol, an oligomer of PTMG or an oligomer of the polyetherglycol to be synthesized may also be added as a part of the starting material to carry out the reaction. The oligomer according to the present invention is not particularly limitatively defined, provided that it has a molecular weight lower than the polymer to be synthesized. More specifically, it is preferred to use an oligomer having a number-average molecular weight within the range of from 100 to 800, when synthesizing a polymer with a number-average molecular weight of 1000 or more, and an oligomer with a number-average molecular weight of 100 to 2000 when synthesizing a polymer with a number-average molecular weight of 3000 or more. Also, an oligomer separated by fractional extraction or vacuum distillation from the PTMG or the copolymerized polyetherglycol synthesized is generally employed. Such an oligomer may be added preferably in an amount of not more than 10% by weight into the starting monomer.

Polymerization degree tends to be lowered as the reaction temperature is increased and therefore, and also in view of the polymerization yield, the polymerization temperature should preferably be $-10°$ to $120°$ C., more preferably $30°$ to $80°$ C. If the temperature exceeds $120°$ C., the yield will be extremely lowered. At a temperature lower than $-10°$ C., the reactivity is very low without practical value.

The time required for the reaction is generally 0.5 to 20 hours, although it may vary depending upon the catalyst amount and the reaction temperature.

Since the reaction can be carried out while stirring THF or a mixture of THF with other cyclic ethers copolymerizable therewith together with a heteropolyacid, no solvent is particularly required.

The reaction may be carried out in any system generally employed such as tank type or tower type vessel. It is also feasible by either batch or continuous system.

After the reaction, according to phase separation, filtration or other methods, the lower layer of the catalyst phase is separated from the upper layer, and unreacted monomer is separated from the upper layer consisting primarily of the polymerization product and its monomer, preferably by distillation. The crude PTMG or PTMG type polyetherglycol may be subjected to the known method such as washing with water for removal of the catalyst entrained in a trace amount to afford a purified polymer.

The present invention is further described by referring to the following Examples.

EXAMPLE 1

Into a 300 ml vessel equipped with a stirrer and a reflux condenser, 200 g of THF with a water content of 300 ppm was charged and 100 g of phosphotungstic acid ($H_3PW_{12}O_{40} \cdot nH_2O$) which had been controlled to a certain number or coordinated water molecules by heating in an electric furnace at a temperature of $150°$ to $200°$ C. for 0.5 to 2 hours was added thereto. After stirring was continued for 4 hours by setting the temperature at $60°$ C., the reaction mixture was left to stand at room temperature and the lower layer of the catalyst phase was removed by separation. Unreacted THF was removed by distillation from the upper layer to obtain a transparent and viscous polymer. As a result of IR-spectrum measurement, the polymer was determined to be a PTMG having both terminal ends of OH groups. The polymerization results are listed in Table 1. The number-average molecular weight and the poly-dispersed degree (weight-average molecular weight/number-average molecular weight) were determined by employing Gel Permeation Chromatography (GPC).

100 ppm was charged and 150 g of a heteropoly-acid which had been controlled to a certain number of coordinated water molecules by heating in an electric furnace at a temperature of 150° to 200° C. for 0.5 to 2 hours was added thereto. After stirring was continued for 2 hours by setting the temperature at a temperature as indicated in Table 2, the reaction mixture was left to stand at room temperature and the lower layer of the catalyst phase was removed by separation. Unreacted THF was removed by distillation from the upper layer to obtain PTWG. Both terminal ends of OH groups

TABLE 1

| | Water (mol) Heteropoly acid (mol) in catalyst phase | State of catalyst phase | PTMG Yield (%) | Number-average molecular weight | Poly-dispersed degree: d*1 |
|---|---|---|---|---|---|
| Examples: | 0.1 | Solid | 14.5 | 6500 | 1.7 |
| | 0.9*2 | Solid | 24.5 | 3100 | 1.9 |
| | 2.5 | Liquid (2 phases) | 24.0 | 1900 | 1.7 |
| | 3.6*3 | Liquid (2 phases) | 20.0 | 1550 | 1.7 |
| | 4.5 | Liquid (2 phases) | 14.0 | 1300 | 1.6 |
| | 5.4 | Liquid (2 phases) | 8.3 | 1000 | 1.6 |
| | 7.2 | Liquid (2 phases) | 2.3 | 800 | 1.6 |
| | 9.0*4 | Liquid (2 phases) | 0.6 | 500 | 1.5 |
| | 13.0 | Liquid (2 phases) | 0.1 | 250 | 1.6 |
| Comparative example: | 29*5 | Homogeneous | trace | — | — |

Foot Note:
*1 d = $\overline{Mw}/\overline{Mn}$, $\overline{Mw}$: weight-average molecular weight, $\overline{Mn}$: number-average molecular weight.
*2 Phosphotungstic acid with a number of coordinated water molecules of 1.0 was employed.
*3 Phosphotungstic acid with a number of coordinated water molecules of 4.0 was employed.
*4 Phosphotungstic acid with a number of coordinated water molecules of 10.0 was employed.
*5 Water (mol)/Heteropoly-acid (mol) ratio in the whole polymerization system.

EXAMPLE 2

Into a 300 ml vessel equipped with a stirrer and a reflux condenser, 150 g of THF with a water content of 40 were determined by IR-spectrum and the number-average molecular weight and the poly-dispersed degree were determined by GPC measurement. The results are shown in Table 2.

TABLE 2

| | Heteropoly-acid (molecular formula) | Water (mol) Heteropoly-acid (mol) in catalyst phase | Polymerization temp. (°C.) | State of catalyst phase | PTMG Yield (%) | Number-average molecular weight | Poly-dispersed degree: d*1 |
|---|---|---|---|---|---|---|---|
| Examples: | Phosphomolybdic acid (12-molybdo-1-phosphoric acid) [$H_3PMo_{12}O_{40}$] | 4.4 | 60 | Liquid (2 phases) | 12 | 1400 | 1.9 |
| | Phosphomolybdic acid (18-molybdo-2-phosphoric acid) [$H_6P_2Mo_{18}O_{62}$] | 0.36 | 60 | Liquid (2 phases) | 12 | 2500 | 1.7 |
| | Phosphomolybdic acid (9-molybdo-1-phosphoric acid) [$H_3PMo_9O_{31}$] | 4.5 | 60 | Liquid (2 phases) | 8 | 1100 | 1.7 |
| | Phosphovanadomolybdic acid [$H_4PVMo_{11}O_{40}$] | 0.72 | 60 | Solid | 10 | 12000 | 1.6 |
| | Silicomolybdic acid [$H_4SiMo_{12}O_{40}$] | 4.5 | 60 | Liquid (2 phases) | 10 | 1300 | 1.8 |
| | Silicotungstic acid [$H_4SiW_{12}O_{40}$] | 4.8 | 50 | Liquid (2 phases) | 12 | 1500 | 1.5 |
| | Arsenictungstic acid [$H_3AsW_{12}O_{40}$] | 4.5 | 60 | Liquid (2 phases) | 8 | 1500 | 1.8 |

TABLE 2-continued

| | Heteropoly-acid (molecular formula) | Water (mol) Heteropoly-acid (mol) in catalyst phase | Polymerization temp. (°C.) | State of catalyst phase | PTMG Yield (%) | Number-average molecular weight | Poly-dispersed degree: d*1 |
|---|---|---|---|---|---|---|---|
| | Germaniumtungstic acid [H$_4$GeW$_{12}$O$_{40}$] | 4.5 | 60 | Liquid (2 phases) | 14 | 1300 | 1.7 |
| | Phosphotungstic acid (18-tungsto-2-phosphoric acid) [H$_6$P$_2$W$_{18}$O$_{62}$] | 3.6 | 60 | Liquid (2 phases) | 9 | 1600 | 1.7 |
| | Phosphotungstic acid [H$_5$BW$_{12}$O$_{40}$] | 3.6 | 60 | Liquid (2 phases) | 8 | 1400 | 1.8 |
| Comparative examples: | Phosphotungstic acid (12-tungsto-1-phosphoric acid) [H$_3$PW$_{12}$O$_{40}$] | 16*2 | 60 | Homogeneous | trace | — | — |
| | Silicotungstic acid [H$_4$SiW$_{12}$O$_{40}$] | 29*3 | 50 | Homogeneous | trace | — | — |

Foot Note:
*1 d = $\bar{M}w/\bar{M}n$, $\bar{M}w$: weight-average molecular weight, $\bar{M}n$: number-average molecular weight.
*2, *3: Water (mol)/Heteropoly-acid(mol) in the whole polymerization system.

EXAMPLE 3

Into a 300 ml vessel equipped with a stirrer and a reflux condenser, 200 g of THF with a water content of 2.0 wt. % was charged and 100 g of an anhydrous 12-tungstosilicic acid which had been prepared by heating in an electric furnace at a temperature of 250° C. for 3 hours was added thereto (the molar ratio of water existing in the catalyst phase to the heteropoly-acid corresponds to 5.8). After stirring was continued at 50° C. for 4 hours, according to the same procedure as described in Example 1, a PTMG with a number-average molecular weight of 1100 was obtained at a yield of 8%.

EXAMPLE 4

Polymerization was carried out by means of the continuous polymerization device as shown in FIGURE. First, into a polymerization tank 1 of 350 ml volume equipped with a stirrer and a reflux condenser, 135 g of phosphotungstic acid with a coordinated water molecules number of 3.3 (H$_3$PW$_{12}$O$_{40}$.3.3H$_2$O) was charged and 270 g of THF with a water content of 200 ppm was added, followed by stirring. The polymerization tank was set at a temperature of 60° C. and THF containing water of 0.4 wt. % was fed at a rate of 60 g/hour. The polymerization tank mixture was circulated between the tank and the phase separation tank 2, and the upper layer separated was withdrawn at a rate of 60 g/hour. From the upper layer, THF was removed by distillation, resulting to provide PTMG. After continuous running for 260 hours, 2.0 Kg of a PTMG with a number-average molecular weight of 1750 was obtained.

During the continuous running as described above, the molar amount of water in the catalyst phase was 3.0 times that of the phosphotungstic acid. During the continuous running, no lowering in activity of the catalyst was observed in the least.

EXAMPLE 5

Into a 300 ml vessel equipped with a stirrer and a reflux condenser, 200 g of THF and each of the cyclic ethers in an amount as indicated in Table 3 were charged. Then, 100 g of phosphotungstic acid with a coordinated water molecules number of 4 (H$_3$PW$_{12}$O$_{40}$.4H$_2$O) was added. After the reaction was continued for 4 hours by setting the temperature at 60° C., the reaction mixture was left to stand at room temperature to be separated into two phases. From the upper layer, unreacted monomer was removed, resulting to provide a transparent and viscous polymer in an amount as indicated in Table 3. The polymer obtained was found to be a polyetherglycol containing cyclic ethers copolymerized in the polyoxymethylene chain as the result of $^1$H-NMR and $^{13}$C-NMR measurements. The number-average molecular weight was determined by GPC measurement. The results were also shown in Table 3.

TABLE 3

| Copolymerized cyclic ether | Amount of co-polymerized cyclic ether (g) | Polymer yield (g) | Number-average molecular weight |
|---|---|---|---|
| Propylene oxide | 8.0 | 53 | 1600 |
| Oxetane | 5.4 | 45 | 1800 |
| 3,3-Dimethyloxetane | 4.5 | 48 | 1500 |
| Ethylene oxide | 8.0 | 65 | 1500 |
| 3-Methyltetrahydrofuran | 5.0 | 40 | 1550 |

EXAMPLE 6

Into a vessel equipped with a stirrer and a reflux condenser, 200 g of THF with water content of 30 ppm and 12 g of a PTMG oligomer having a number-average molecular weight of 250 were charged. Then, 100 g of a phosphotungstic acid which had been controlled to a coordination water molecules number of 3 (H$_3$PW$_{12}$O$_{40}$.3H$_2$O) was added. The temperature was set at 60° C. and stirring was continued for 8 hours. The reaction mixture was left to stand at room temperature and the lower layer of the catalyst phase was removed by separation. Unreacted THF was removed from the upper layer, resulting to provide 58 g of a PTMG with a number-average molecular weight of 1630.

EXAMPLE 7

Into a vessel equipped with a stirrer and a reflux condenser, 200 g of THF with a water content of 30 ppm and 8 g of propylene oxide were charged. Then, 4 g of a PTMG oligomer with a number-average molecular weight of 250 or a copolymerized polyetherglycol of THF and propylene oxide (propylene oxide content: 15 wt.%) was added, and thereafter 100 g of phosphotungstic acid which had been controlled to a coordinated water molecules number of 4 ($H_3PW_{12}O_{40}.4H_2O$) was added. The reaction was continued for 4 hours at a temperature set at 60° C., and then the reaction mixture was left to stand at room temperature to be separated into two phases. Unreacted monomer was removed from the upper layer and a polyetherglycol containing propylene oxide copolymerized in the polyoxytetramethylene chain was obtained with an yield as shown in Table 4.

TABLE 4

| Oligomer added | Polymer yield | Number-average molecular weight |
| --- | --- | --- |
| PTMG | 57 g | 1600 |
| THF—propylene oxide copolymerized polyetherglycol | 59 g | 1580 |

EXAMPLE 8

Into a vessel equipped with a stirrer and a reflux condenser were charged 100 g of THF and 100 g of 3-methyloxetane. While the reaction vessel was cooled with iced water, 100 g of phosphotungstic acid which had been controlled to a coordinated water molecules number of 4 ($H_3PW_{12}O_{40}.4H_2O$) was slowly added under stirring. Stirring was conducted at 0° C. for 30 minutes, then the temperature was set at 45° C. to continue the reaction for 4 hours. The reaction mixture was then left to stand at room temperature to be separated into two phases. After removal of unreacted momomer from the upper layer, 55 g of polymer was obtained. As the result of $^1$H-NMR measurement, the polymer obtained was found to be a polyetherglycol containing 85 wt. % of 3-methyloxetane copolymerized therein.

We claim:

1. A process for directly producing a polyoxytetramethylene glycol having hydroxyl groups at both terminals thereof, comprising polymerizing tetrahydrofuran in the presence of a catalyst phase comprising a heteropoly-acid catalyst and 0.1 to 15 mol of water per mol of heteropoly-acid.

2. A process according to claim 1, wherein the molar ratio of water to heteropoly-acid catalyst present in the catalyst phase is 1 to 8.

3. A process for directly producing a polyetherglycol copolymer including 0.5 to 99.5 wt.% oxytetramethylene groups, said process comprising copolymerizing tetrahydrofuran with at least one cyclic ether copolymerizable therewith in the presence of a catalyst phase comprising a heteropoly-acid catalyst and 0.1 to 15 mol of water per mol of heteropoly-acid present.

4. A process according to claim 3, wherein the molar ratio of water to heteropoly-acid in the catalyst phase is 1 to 8.

5. The process of claim 1, wherein an oligomer of polyoxytramethylene glycol is initially present during the polymerization reaction in addition to tetrahydrofuran.

6. The process of claim 3, wherein the copolymerization is carried out in the presence of at least one member selected from the group consisting of an oligomer of polyoxytetramethylene glycol and an oligomer of copolymerized polyetherglycols formed from copolymerization of tetrahydrofuran with at least one cyclic ether copolymerizable therewith; in place of a portion of the starting monomer in the polymerization system.

7. A process according to any one of claims 1 to 6, wherein the catalyst is recovered from the polymerization system after the polymerization by phase separation or filtration.

8. A process according to claim 3, 4 or 6, wherein said cyclic ether copolymerizable with tetrahydrofuran is a 3-membered ether represented by the formula:

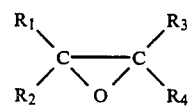

wherein $R_1$–$R_4$ may be the same or different and represent hydrogen atoms, alkyl groups having 1 to 10 carbon atoms, halogen atoms, halo-substituted alkyl groups having 1 to 10 carbon atoms or phenyl groups.

9. A process according to claim 3 4 or 6, wherein said cyclic ether is a 4-membered ether represented by the formula:

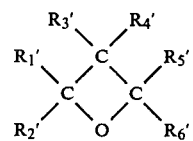

wherein $R_1'$–$R_6'$ may be the same or different and represent hydrogen atoms, alkyl groups having 1 to 10 carbon atoms, halogen atoms or halo-substituted alkyl groups having 1 to 10 carbon atoms.

10. A process according to claim 3 4 or 6, wherein said cyclic ether is a 5-membered ether represented by the formula:

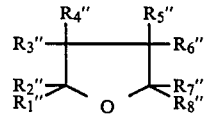

wherein $R_1''$–$R_8''$ may be same or different and represent hydrogen atoms, alkyl groups having 1 to 10 carbon atoms, halogen atoms or halo-substituted alkyl groups having 1 to 10 carbon atoms, provided that at least one of $R_1''$–$R_8''$ is not hydrogen.

11. A process according to claim 5 or 6, wherein said oligomer has a number-average molecular weight of 100 to 800 and is present in the starting material in an amount not more than 10 wt.% and wherein the product obtained is a polyetherglycol with a number-average molecular weight not less than 1,000.

12. A process according to claim 5 or 6, wherein said oligomer has a number-average molecular weight of 100 to 2,000, its content in the starting material being not more than 10 wt.% and wherein the product obtained is a polyetherglycol with a number-average molecular weight of not less than 3,000.

13. A process according to any one of claims 1 to 6, wherein said heteropoly-acid catalyst has at least one condensation coordinated atom selected from the group consisting of Mo, W and V.

14. A process according to claim 13, wherein said heteropoly-acid catalyst has one center atom selected from the group consisting of P, Si, As, Ge, B, Ti, Ce and Co, and the atomic ratio of the condensation coordinated atom to the center atom is 2.5 to 12.

15. A process according to claim 14, wherein said heteropoly-acid is selected from the group consisting of 12-molybdophosphoric acid, 18-molybdo-2-phosphoric acid, 9-molybdophoshoric acid, 12-tungstophosphoric acid, 18-tungsto-2-phosphoric acid, 11-molybdo-1-vanadophosphoric acid, 12-molybdotungstophosphoric acid, 6-molybdo-6-tungstophosphoric acid, 12-molybdotungstovanadophosphoric acid, 12-tungstovanadophosphoric acid, 12-molybdosilicic acid, 12-tungstosilicic acid, 12-molybdotungstosilicic acid, 12-molybdotungstovanadosilicic acid, 12-tungstoboric acid, 12-molybdoboric acid, 12-molybdotungstoboric acid, 12-molybdovanadoboric acid, 12-molybdotungstovanadovoric acid, 12-tungstogermanic and 12-tungstoarsenic acid.

16. A process according to claim 7, wherein the heteropoly-acid has at least one condensation coordinated atom selected from the group consisting of Mo, W and V.

17. A process according to claim 16, wherein the heteropoly-acid has one center atom selected from the group consisting of P, Si, As, Ge, B, Ti, Ce and Co, and the atomic ratio of the condensation coordinated atom to the center atom is 2.5 to 12.

18. A process according to claim 17, wherein the heteropoly-acid is selected from the group consisting of 12-molybdophosphoric acid, 18-molybdo-2-phosphoric acid, 9-molybdophosphoric acid, 12-tungstophosphoric acid, 18-tungsto-2-phosphoric acid, 11-molybdo-1-vanadophosphoric acid, 12-molybdotungstophosphoric acid, 6-molybdo-6-tungstophosphoric acid, 12-molybdotungstovanadophosphoric acid, 12-tungstovanadophosphoric acid, 12-molybdosilicic acid, 12-tungstosilicic acid, 12-molybdotungstosilicic acid, 12-molybdotungstovanadisilicic acid, 12-tungstoboric acid, 12-molybdoboric acid, 12-molybdotungstoboric acid, 12-molybdovanadoboric acid, 12-molybdotungstovanadovoric acid, 12-tungstogermanic acid and 12-tungstoarsenic acid.

19. A process according to claim 15, wherein the step of polymerizing is carried out in the temperature range of from $-10°$ C. to $120°$ C.

20. A process according to claim 15, wherein the polymerization is carried out in the temperature range of from $30°$ C. to $80°$ C.

21. The process of claims 1 or 3, wherein the catalyst in an amount between 0.05 and 20 times the amount of tetrahydrofuran is used.

22. The process of claim 7 wherein the catalyst recovered is used repeatedly in the polymerization reaction.

* * * * *